UNITED STATES PATENT OFFICE.

WILHELM BERGDOLT, OF LEVERKUSEN, GERMANY, ASSIGNOR TO FARBENFABRIKEN VORM. FRIEDR. BAYER & CO., OF ELBERFELD, GERMANY, A CORPORATION OF GERMANY.

AZO DYE.

963,739.  Specification of Letters Patent. Patented July 12, 1910.

No Drawing.  Application filed March 14, 1910.  Serial No. 549,164.

*To all whom it may concern:*

Be it known that I, WILHELM BERGDOLT, doctor of philosophy, chemist, citizen of the German Empire, residing at Leverkusen, Germany, have invented new and useful Improvements in Azo Coloring-Matter, of which the following is a specification.

My invention relates to the manufacture and production of new bluish-black to black trisazo dyestuffs which are distinguished by their great solubility in water and their excellent affinity for vegetable fibers. They are specially suitable for dyeing half-woolen goods and do not dye wool in these fabrics.

The new dyes are obtained by combining the tetrazo compounds prepared from para-aminobenzene-azo-2-amino-8-naphthol-6-sulfonic acid or from para-aminobenzene-azo-2-amino-5-naphthol-7-sulfonic acid with one molecule of a meta-diaminobenzene- or toluene sulfonic acid and with one molecule of 2-amino-5-naphthol-7-sulfonic acid or of a derivative of the latter compound, or vice versa.

The new dyes are in the shape of their alkaline salts dark powders soluble in water generally with a bluish-black color and soluble in concentrated sulfuric acid with a blue color.

In order to illustrate the new process more fully the following example is given, the parts being by weight:—35.8 parts of the monoazo dyestuff having the formula:

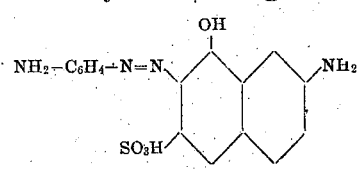

are tetrazotized by means of 14 parts of sodium nitrite and the necessary quantity of HCl and the tetrazo compound thus prepared is mixed with an aqueous solution of 21 parts of the sodium salt of meta-phenylenediamin monosulfonic acid

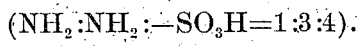

Sodium carbonate is added to neutralize the free mineral acid. The intermediate compound which forms at once is mixed with 31.5 parts of 2-phenylamino-5-naphthol-7-sulfonic acid dissolved in 700 parts of water containing 35 parts of sodium carbonate. The mixture is stirred for several hours, the dyestuff is (if necessary salted out), filtered off and dried. It is in the shape of its sodium salt, after being dried and pulverized a dark powder soluble in water with a bluish-black and soluble in concentrated sulfuric acid with a blue color. It dyes cotton deep blue-black and yields upon reduction with stannous chlorid and hydrochloric acid para-phenylenediamin, triaminobenzene-mono-sulfonic acid (1:2:4:5), 2.7-diamino-8-naphthol-6-sulfonic acid and 2-phenylamino-6-amino-5-naphthol-7-sulfonic acid.

In the example the para-aminobenzene-azo-2-amino-8-naphthol-6-sulfonic acid can be replaced by the para-aminobenzene-azo-2-amino-5-naphthol-7-sulfonic acid and the meta-phenylenediamin sulfonic acid by the meta-toluylenediamin sulfonic acid, the 2-phenylamino-5-naphthol-7-sulfonic acid can be replaced by the 2-amino-5-naphthol-7-sulfonic acid itself or by other derivatives of this acid. Furthermore the tetrazo compound can be combined first with the 2-amino-5-naphthol-7-sulfonic acid and then with the meta-phenylenediamin sulfonic acid.

I claim:—

1. The herein described new trisazo dyestuffs which are after being dried and pulverized dark powders soluble in water generally with a bluish-black color and being soluble in concentrated sulfuric acid generally with a blue color, dyeing cotton bluish-black to black shades but not dyeing wool in half-wool, substantially as described.

2. The herein described new trisazo dyestuff obtainable from para-phenylenediamin, 2-amino-8-naphthol-6-sulfonic acid, 2-phenylamino-5-naphthol-7-sulfonic acid and meta-phenylenediamin sulfonic acid, which is after being dried and pulverized a dark powder soluble in water with a bluish-black color, soluble in concentrated sulfuric acid with a blue color, dyeing cotton blue-black shades but not dyeing wool in half wool and yielding upon reduction with stannous chlorid and hydrochloric acid para-phenylenediamin, triaminobenzene sulfonic acid (1:2:4:5), 2.7-diamino-8-naphthol-6-sulfonic acid and 2-phenylamino-6-amino-5-naphthol-7-sulfonic acid, substantially as described.

In testimony whereof I have hereunto set my hand in the presence of two subscribing witnesses.

WILHELM BERGDOLT. [L. S.]

Witnesses:
    OTTO KÖNIG,
    CHAS. J. WRIGHT.